United States Patent [19]

Zodrow

[11] Patent Number: 4,814,031

[45] Date of Patent: Mar. 21, 1989

[54] METHOD OF IMPRINTING THE UPPER SURFACE OF A CONTAINER

[76] Inventor: Rudolf Zodrow, Lichtstr. 37, 4000 Dusseldorf, Fed. Rep. of Germany

[21] Appl. No.: 919,094

[22] Filed: Oct. 15, 1986

[30] Foreign Application Priority Data

Dec. 13, 1985 [DE] Fed. Rep. of Germany ....... 3544070

[51] Int. Cl.[4] ........................ B32B 31/00; B65C 3/22; B29C 59/00

[52] U.S. Cl. .................................... 156/154; 156/221; 156/223; 156/DIG. 16; 264/119

[58] Field of Search ............... 156/219, 277, 220, 221, 156/222, 223, 468, 485, 488, 493, 154, DIG. 16, DIG. 42, 73.5, 155, 267, 281; 264/293, 119, 163, 284, 296; 101/323 R, 426; 428/156, 187; 29/90 R, 90 S; 215/316, 349

[56] References Cited

U.S. PATENT DOCUMENTS

| | | | |
|---|---|---|---|
| 2,695,121 | 11/1954 | Fairest et al. | 156/488 |
| 2,967,357 | 1/1961 | Watson | 434/82 |
| 4,105,816 | 8/1978 | Hori | 264/293 |
| 4,284,453 | 8/1981 | Endrizzi | 427/264 |
| 4,294,634 | 10/1981 | Mookil | 434/82 |
| 4,414,056 | 11/1983 | Buchholz et al. | 156/488 |

FOREIGN PATENT DOCUMENTS 3345226 6/1985 Fed. Rep. of Germany .

*Primary Examiner*—Donald E. Czaja

*Assistant Examiner*—Louis Falasco

*Attorney, Agent, or Firm*—Sprung Horn Kramer & Woods

[57] ABSTRACT

A method of and device for imprinting the upper surface of a container that has a closure at its upper surface, especially of a bottle with a head that is wrapped along with its cap all the way around with a blank, especially of foil, by applying the blank around the head while leaving part of the blank to project beyond it, wrapping the sleeve-shaped extension to one side against the upper surface of the cap, and pressing it down with a resilient pad. The disk is embossed at the upper surface, the blank of foil is pressed down with the resilient pad, forcing foil into the embossed areas, and the raised areas of the embossing are then burnished with a hard pressure-application component.

6 Claims, 5 Drawing Sheets

METHOD OF IMPRINTING THE UPPER SURFACE OF A CONTAINER

BACKGROUND OF THE INVENTION

The present invention relates to a method of imprinting the upper surface of a container that has a closure at its upper surface, especially of a bottle with a head that is wrapped along with its cap all the away around with a blank, especially of foil, by applying the blank around the head while leaving part of the blank to project beyond it, wrapping the sleeve-shaped extension to one side against the upper surface of the cap, and pressing it down with a resilient pad.

The upper surface of containers, especially bottles, is frequently imprinted with printed or embossed matter. With crown-corked bottles that are not wrapped with foil, it is the upper surface of the cork that is imprinted. Enclosing the head and cork of a crown-corked bottle in a capsule of plastic or lead already embossed with printed matter is also known. Finally, bottles closed with stoppers that have heads embossed with printed matter are also known.

This method of imprinting, however, is unknown in relation to containers, especially bottles, that have their head and closure complete wrapped in a blank of foil, even though incising a code that identifies the bottling date at the edge of the belly label is known.

SUMMARY OF THE INVENTION

The object of the present invention is to provide a method of and device for imprinting the upper surface of a container, especially a bottle, that is wrapped with a blank of foil in the vicinity of its head.

This object is attained in a method in accordance with the invention in a the disk is embossed at the upper surface, the blank of foil is pressed down with the resilient pad, forcing foil into the embossed areas, and the raised areas of the embossing are then burnished with a hard pressure-application component. Either the upper surface of the closure itself can be embossed or an embossed disk can be positioned over it.

The method in accordance with the invention is outstanding in that, while retaining the advantage of an attractive container that derives from the use of the foil, an imprint of any type can be attained on the upper surface in a very simple way that is appropriate for high outputs. The method allows the use of conventional, very thin foil. Even when the embossing is very shallow, the matter will show up well because of the subsequent burnishing of the raised areas.

To make the embossing show up even better, the raised areas can be colored while they are being burnished. This can be accomplished if the hard pressure-application component is inked like a rubber stamp.

Good contrast between the depressed and raised areas of the embossing can even be attained when crinkled foil is employed.

To facilitate bringing the embossing out, the foil should be wrapped over the upper surface in extensively one layer. The method and device disclosed in copending U.S. patent application Ser. No. 916,582 filed Oct. 8, 1986, are particularly appropriate for this purpose.

The object is also obtained in a device for carrying out the aforesaid method and having station for applying blanks of foil to the containers and located alongside the path that they travel in, application and wrapping components, a resilient pad that can be applied to the upper surface of the containers and press down the blank of foil not only at the top but also at the sides, and a hard imprinting component that presses down against the upper surface is positioned downstream of the resilient pad in the path traveled by the containers. An inking component can also be associated with the hard pressure-application component.

The embossing is applied, as are the labels, while the bottles travel through the labeling machine, necessitating only the additional burnishing station.

Some preferred embodiments of the invention will now be described with reference to the attached drawings, wherein

DETAILED DESCRIPTION OF THE PREFERRED EMBODIMENTS

Figure 1:
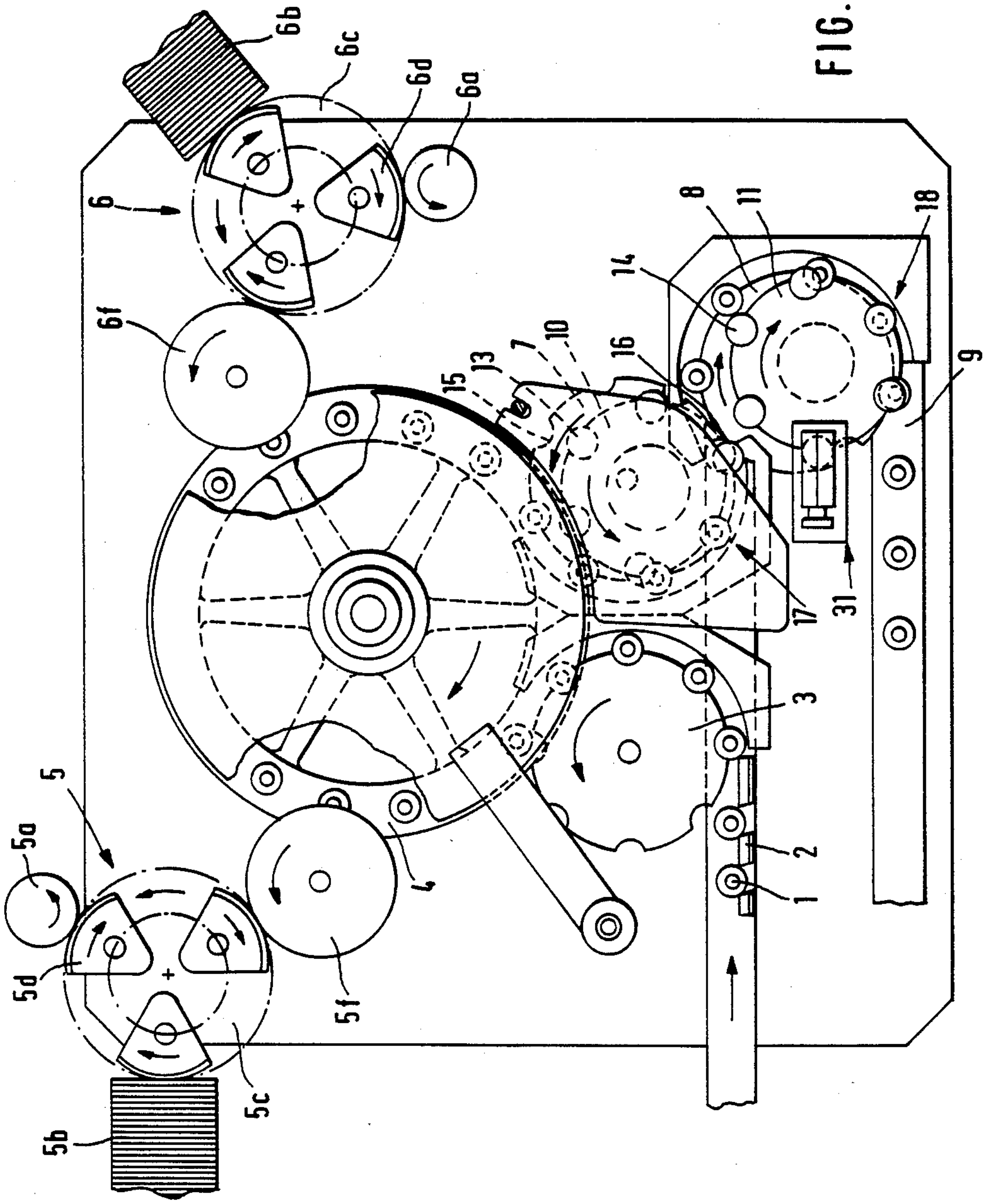
FIG. 1 is a schematic view of a labeling machine from the top.

Bottles 1 that are to be labeled and have foil applied to them arrive in the accommodations in a turntable 4 from an intake worm 2 and an intake wheel 3. As the bottles travel along in turntable 4 they arrive first in front of a belly labeling station 5 and then in front of a foil-application station 6. Each station 5 and 6 has an adhesive-application roller 5*a* or 6*a*, a stationary magazine 5*b* or 6*b* for labels or blanks of foil respectively, a rotating carrier 5*c* or 6*c* with label or blank transfer elements 5*d* or 6*d* respectively, and a gripper cylinder 5*f* or 6*f* for applying the labels or blanks respectively to the bottles.

The total surface of the labels or blanks applied to bottles 1 by gripper cylinders 5*f* or 6*f* respectively is, as the bottles continue to travel, smoothed down downstream of stations 5 and 6 by unillustrated stroking components (brushes), with each bottle rotating around its own axis. A section of foil is, however, left projecting or extending above the head of the bottle in the shape of a sleeve. The bottles, accordingly provided with labels and foil, travel through two outtake wheels 7 and 8 and arrive with the sleeve-shaped extension downstream at an outtake worm 9. In outtake wheel 7 the sleeve-shaped extension is wrapped down against the upper surface of the bottle cap and pressed down at its upper surface and sides. In outtake wheel 8 the upper surface of the foil is burnished and colored. The bottles are secured in their angular position as they travel through outtake wheels 7 and 8 by known and unillustrated means, clamps for example.

Above and eccentrically positioned in relation to each outtake wheel 7 and 8 is a circular plate 10 and 11 that carries the components, specified in what follows, for pressing down and burnishing the sleeve-shaped extension of the blank of foil. The distance between (circumferential distribution of) the only schematically illustrated sites 13 and 14 around carrier plate 10 corresponds to that distance between the accommodations 15 and 16 around each outtake wheel 7 and 8. At certain points 17 and 18, as will be evident from FIG. 1, the paths of accommodations 15 and 16 are tangential to or slightly intersect that of sites 13 and 14. Given the difference between the diameters of outtake wheels 7 and 8 and carrier plates 10 and 11, the orbits of accommodations 15 and 16 and sites 13 and 14, and the eccentric position of plates 10 and 11, outtake wheels 7 and 8 and carrier plates 10 and 11 are powered to rotate at essentially the same speed at points 17 and 18. As will also be evident from FIG. 1, each site 13 and 14 travels over an accommodation 15 or 16 respectively as the site enters the latter's path and coincides with it at points 17 and 18.

Since the design of each carrier plate 10 and 11 and each outtake wheel 7 and 8 is identical, only carrier plate 10 and outtake wheel 7 will be specified.

Figure 2:
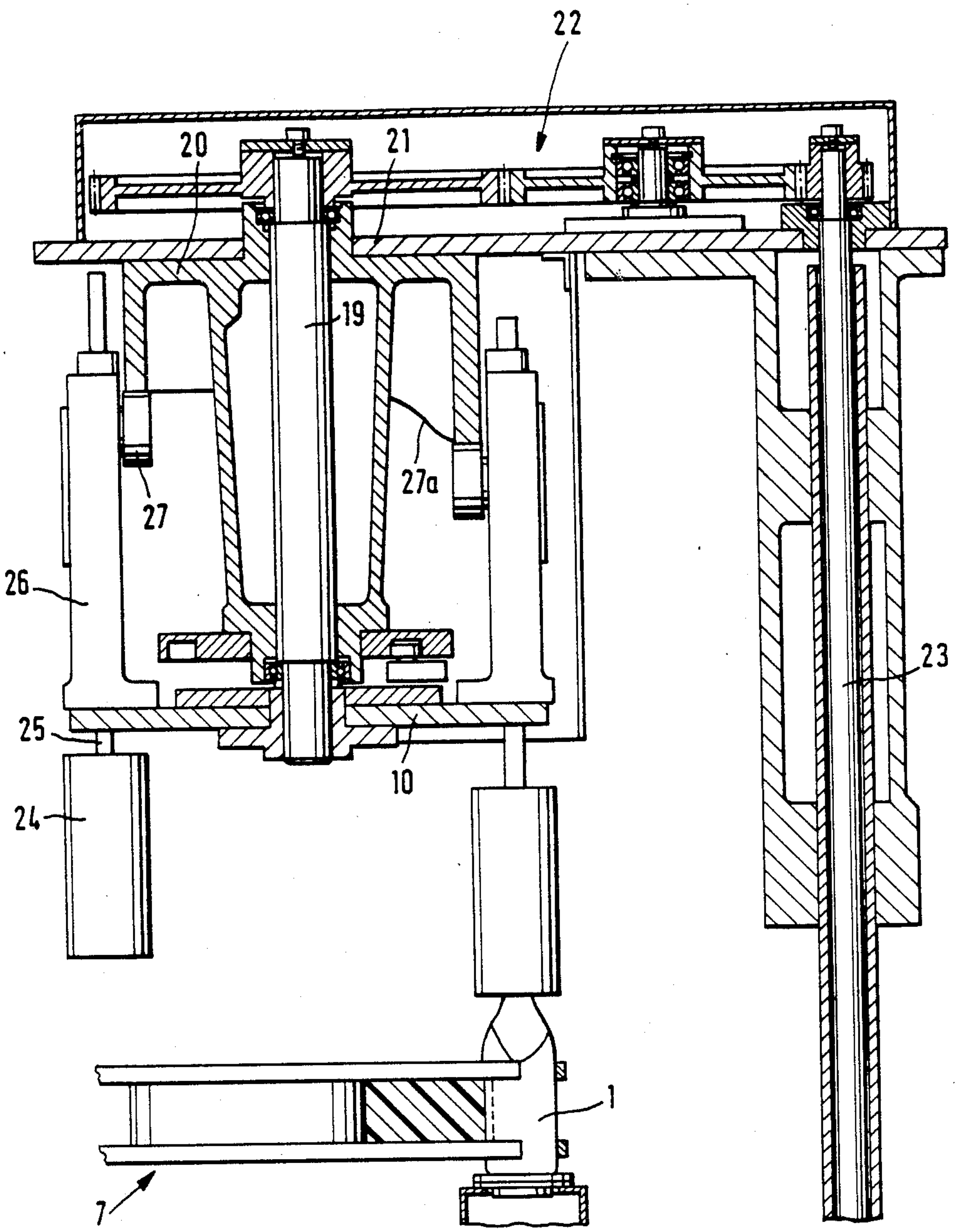
FIG. 2 is a section through the outtake wheel of the labeling machine along the line I—I in FIG. 1.

FIG. 2 illustrates the design of the circular carrier plate 10 above outtake wheel 7. Carrier plate 10 is mounted on a shaft 19 and secured in a bearing box 20 fastened to a base plate 21. Shaft 19 is driven through a gear bridge 22 by another shaft 23 deriving from the main drive mechanism. Mounted at each site 13 around carrier plate 10 is a pressure-application component 24 that can be raised and lowered. Each pressure-application component 24 is raised and lowered in a housing 26 by means of a positioning rod 25. Positioning rod 25 is engaged by an unillustrated compression spring that forces pressure-application component 24 into its upper position, illustrated at the left in FIG. 2. Positioning rod 24 is also engaged by a follower 27 that operates in conjunction with a stationary cylindrical cam 27*a* on bearing box 20. Thus, each pressure-application component 24 is raised and lowered in conformity with cylindrical cam 27*a* as carrier plate 10 rotates.

The design of a plate 10 for carrying pressure-application components and its position relative to an outtake wheel is in itself known from U.S. Pat. No. 4,613,397.

Figure 4:
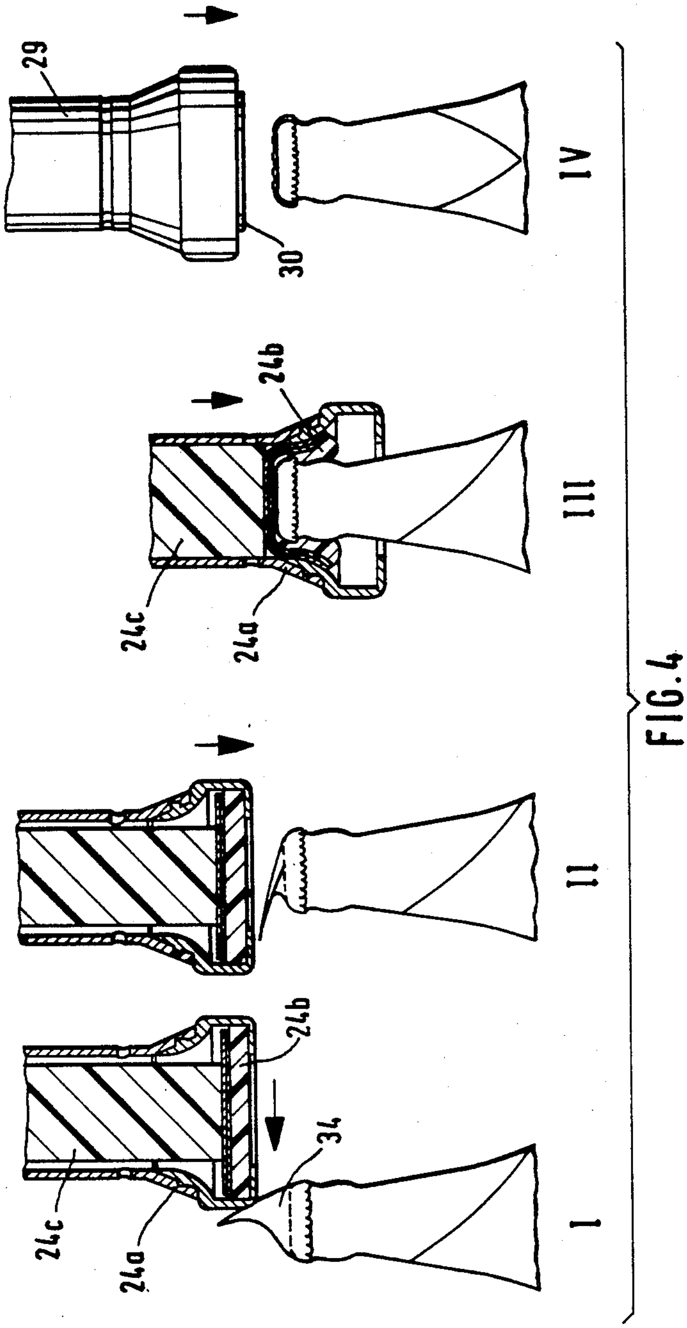
FIG. 4 is a side view of a bottle during various phases of imprinting.

Pressure-application component 24 has, as will be most obvious with reference to the stages I through III illustrated in FIG. 4, a flowerpot-shaped housing 24*a* that accommodates a resilient pad 24*b*. Pad 24*b* is mounted at the rear to a resilient structure 24*c*. When the pressure-application component is lowered onto the head of the bottle, pad 24*b* is rolled over all sides of the head, gently applying the foil flat.

Figure 3:
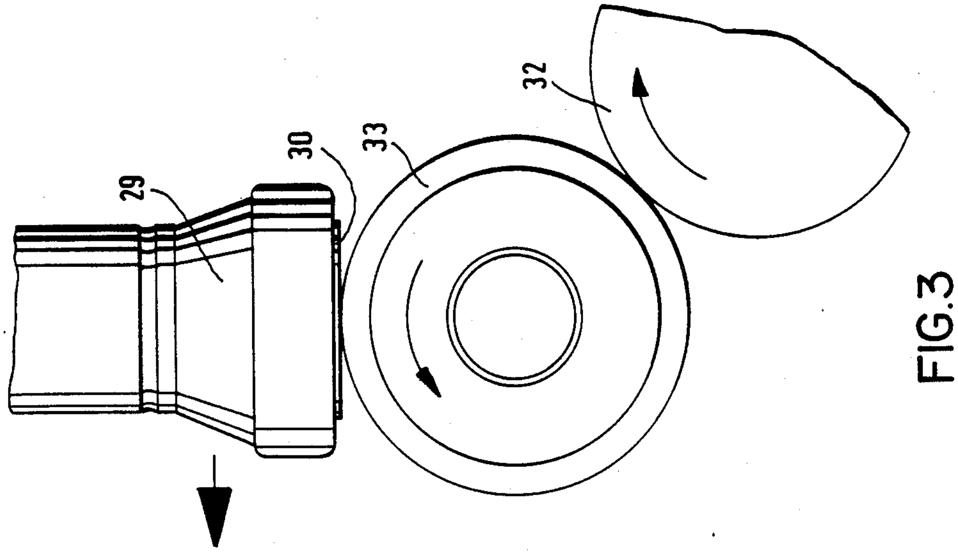
FIG. 3 illustrates a section of a pressure-application component for burnishing and coloring the upper surface of a blank of foil.
Figure 3A:
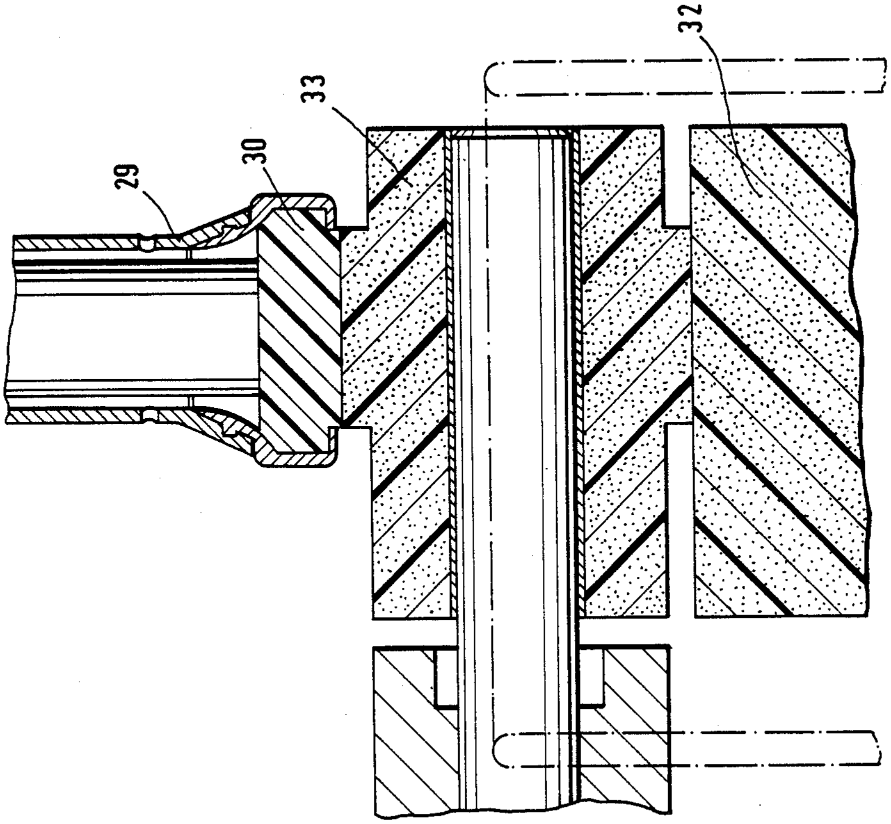
FIG. 3*a* illustrates a side view of the component of FIG. 3.

Carrier plate 10 is equipped with resilient pads 24*b* for the steps I through III illustrated in FIG. 4. Carrier plate 11 is equipped with components 29 for burnishing the foil at the upper surface of the bottle. Components 29 differ from components 24 only in that they have a hard plate 30 instead of a resilient pad 24*b*. Associated with each smoothing component 29 is an inking component 31 (FIG. I) in the idle section of the path through outtake wheel 8. As shown in FIG. 3 and FIG. 3*a*, inking components 31 consist of a dip roller 32 that immerses in a reservoir of ink and of an ink-transfer roller 33. As carrier plate 11 rotates, ink-transfer roller 33 rolls over the hard plate 30 in each burnishing component 29 and supplies it with ink.

The individual steps in imprinting a bottle will now be specified with reference to FIG. 4.

Figure 5:
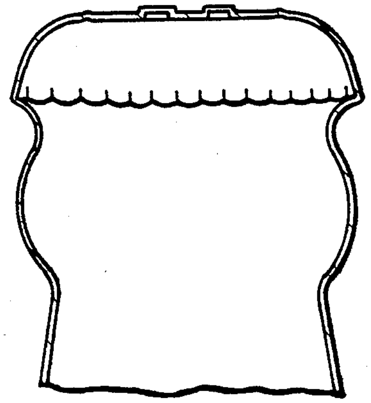
FIG. 5 illustrates, from the side a bottle that has been imprinted.
Figure 5A:
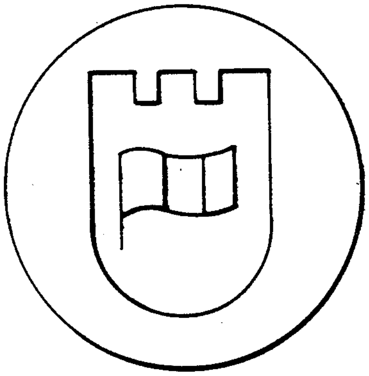
FIG. 5*a* illustrates from the top the bottle of FIG. 5.

Bottles 1, provided with a crown cork that is embossed on the upper surface, arrive with the sleeve-shaped extension 34 of a blank of foil that has been wrapped around the head in the vicinity of the turntable in the accommodations 15 in outtake wheel 7. Pressure-application components 24 pass over the bottles as they travel through outtake wheel 7, with flowerpot-shaped housing 24*a* wrapping sleeve-shaped extension 34 over the upper surface of the cork as illustrated in steps I and II. At point 17, where the positions of pressure-application component 24 and bottle 1 coincide, component 24 is lowered axially with its resilient pad 24*b* covering the head of the bottle, forcing the foil, which rests loose against the upper surface of the cork, into the embossing, and pressing the edge of the blank around the cork. If the foil is slightly crinkled, it can expand better into the embossing. The foil is also stretched in the vicinity of the raised areas, which has a positive effect on the contours of the embossing. This is the step III in FIG. 3. The bottle is then transferred to the accommodations 16 in outtake wheel 8. As soon as the bottle, traveling through outtake wheel 8, arrives at point 18, a smoothing component 29, represented in FIG. 4 with reference to step IV, descends, forcing hard plate 30 against the upper surface of the cork. This burnishes the raised areas and simultaneously in this particular embodiment colors them because plate 30 has been supplied with ink from inking component 31 at each rotation. The result is the bottle imprinted on its upper surface and illustrated in FIG. 5 and FIG. 5*a*.

It will be appreciated that the instant specification and claims are set forth by way of illustration and not limitation, and that various modifications and changes may be made without departing from the spirit and scope of the present invention.

What is claimed is:

1. In a method of imprinting the upper surface of a bottle with a head having a cap at its upper surface, including applying a blank of foil around the head while leaving a sleeve-shaped portion of the blank to project beyond the head, wrapping the sleeve-shaped portion towards one side and against an upper surface of the cap, and pressing down the sleeve-shaped portion with a resilient pad, the improvement comprising: providing an embossed surface at the upper surface of the cap, pressing down the blank of foil with the resilient pad to force the foil into the embossed surface, and burnishing the raised areas of the foil on the embossed surface with a hard pressure-application component.

2. The method as in claim 1, wherein the step of providing an embossed surface comprises embossing the upper surface of the cap itself.

3. The method as in claim 1, wherein the step of providing an embossed surface comprises positioning an embossed disk over the cap.

4. The method as in claim 1, further comprising inking the hard pressure-application component.

5. The method as in claim 1, further comprising employing crinkled foil blanks.

6. The method as in claim 1, wherein the foil is wrapped over the upper surface in extensively one layer.

* * * * *